April 14, 1970          J. W. LAWLOR          3,505,754
FISH LURE
Filed July 29, 1968
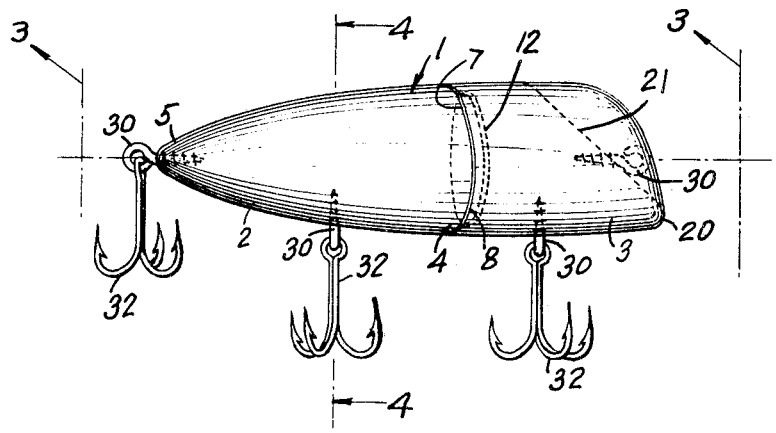
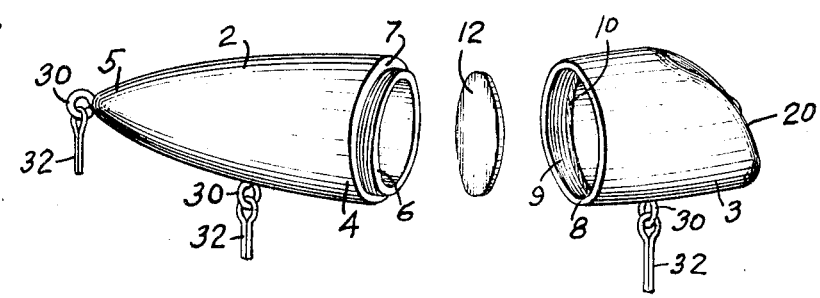
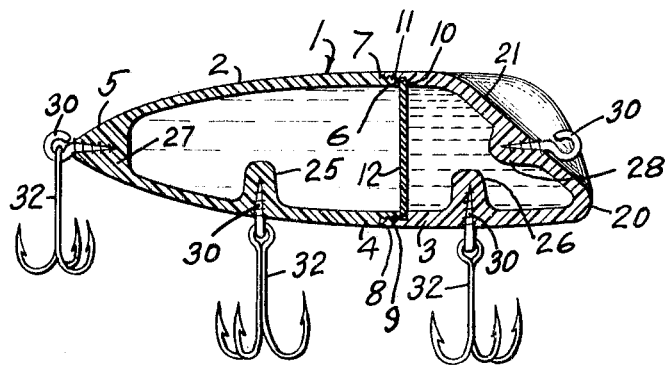
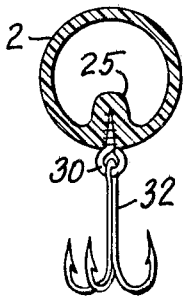
INVENTOR,
JOSEPH W. LAWLOR,
BY
ATTORNEY

United States Patent Office 3,505,754
Patented Apr. 14, 1970

3,505,754
FISH LURE
Joseph W. Lawlor, P.O. Box 7374,
North Las Vegas, Nev. 89101
Filed July 29, 1968, Ser. No. 748,358
Int. Cl. A01k 85/00
U.S. Cl. 43—42.22     1 Claim

ABSTRACT OF THE DISCLOSURE

A fish lure having a body which is formed in two hollow sections detachably connected together. The rear section is tapered from the point of joinder with the front section to the tail portion and the front section is provided with a rearwardly inclined front wall, which wall is transversely curved on a uniform radius. At the zone of connection between the front section and the rear section is a disk which seals the front section from the rear section. Both sections carry depending fish hooks and the inclined wall of the front section is adapted to be secured to a fish line. The front section may be ballasted by placing water therein which water is confined between the disk and the inclined front wall. The lure may receive inserts within one or both sections to attract game fish.

---

An object of the invention is to provide a lure of inexpensive construction and which is effective in attracting game fish as the lure is drawn through the water either slowly or rapidly.

A further object is the provision of a lure so constructed and arranged that it may move under the surface of water or on the surface of water while trolling the lure.

With the above and other objects in view, the invention consists in the novel and useful provision, formation, construction, association, and relative arrangement of parts, members and features, all as shown in one embodiment in the drawing, described generally, and more particularly pointed out in the claim.

In the drawing:

FIGURE 1 is a perspective view of the lure;

FIGURE 2 is a detached view of the front and rear sections of the lure shown in FIGURE 1;

FIGURE 3 is a longitudinal sectional view on the line 3—3 of FIGURE 1; and

FIGURE 4 is a sectional view on the line 4—4 of FIGURE 1.

Referring now to the drawing, the lure includes a body 1 formed in two parts; to wit, a rear section 2 and a front section 3. The sections are tubular in nature, that is to say, hollow. The rear section is tapered from the open end 4 thereof to the tail portion 5. The open end of the lure is provided with an annular externally threaded part 6 of reduced diameter relative to the external diameter of the open end of the rear section. This provides a shoulder 7. The front section has an open end at 8 which is internally threaded at 9 for reception of the threads of portion 6. The threaded area is such as to be greater in diameter than the internal diameter of the front section to provide a shoulder at 10 whereby when the front section and the rear section are secured together, a rabbet joint as shown in FIGURE 3 at 11 results. A disk 12 is adapted to seal communication between the two sections and this disk has a diameter which fits in the threaded part of the front section and abuts the shoulder 10. In this connection, the front edge of portion 6 abuts the opposite surface of the disk 12 as shown in FIGURE 3. The forward or head end 20 of the front section is inclined rearwardly, as shown in FIGURE 3 at 21 and in addition said front wall is transversely concave on a uniform radius.

The lure may be formed of any material desired such as plastic which may be transparent. In the molding of the front and rear sections of the body internal bosses are formed, as shown at 25 and 26. The tail end of the rear section is thickened or enlarged at 27 and the front section and particularly the head has an internal boss 28 formed on the inclined front wall. These bosses and portion 27 provide a means for securing screws to the lure.

Screws 30 having eyes pass externally through the sections into the bosses 25, 26 and 28, and, likewise, into the thickened portion 27, and the screw eyes in each instance carry gang or treble fish hooks designated generally as 32. The eye of the screw 30, secured to the front wall 21, is adapted to secure one end of a fish line. The spacing between the fish hooks is such that the fish hooks may move relative to the eyes of the screws without fouling each other when the lure is being cast or while the lure is within the water.

The operation, uses and advantages of my invention are as follows.

The construction of the lure is such as to lend the same to simple and inexpensive molding of the front and rear sections. The screw threaded rabbet connection is effective in holding the disk 12 between the front open end of the rear section and the rear open end of the front section whereby the interiors of the sections do not communicate but are sealed from each other. However, this seal is easily broken by unthreading the two sections to fill one or the other section with water which causes the lure to sink beneath the surface of the water. The rear section by being hollow is lighter than the front section when the front section contains water, and as the lure is trolled the inclined front wall of the front section causes the lure to have a wiggling movement or a transverse reciprocal movement. Such a movement is attractive to game fish with the result that a game fish may be hooked by a hook carried by the lure. It is a known fact that color is likewise attractive to fish and the lure sections may receive colored inserts which are visible through the transparent front and rear sections of the body of the lure.

I claim:

1. A fish lure having a body to which a plurality of fish hooks are secured at spaced intervals by screw eyes so as to be swingable in various planes without fouling each other; said body consisting of a transparent front section and a separate transparent rear section, both sections being hollow; the front section having a head end or wall which is inclined rearwardly and is transversely concave on a uniform radius; a screw eye fixed to said head end to permit attachment of a fish line; the front section having screw threads at its rear end and the rear section having screw threads at its forward end, said threads engaging so as to rigidly units the two sections; a rabbet joint being provided where the two sections are joined; and a circular imperforate disk having its peripheral area removably gripped in the rabbet joint to seal off the front section from the rear section; either or both sections being adapted to hold a quantity of water so as to increase the specific gravity of the lure body; both transparent sections being adapted to hold colored inserts to enhance the attractiveness of the lure to fish.

References Cited

UNITED STATES PATENTS

| | | | |
|---|---|---|---|
| 538,169 | 4/1895 | Kelley | 43—42.35 |
| 1,878,015 | 9/1932 | Steffensen | 43—42.35 X |
| 2,112,385 | 3/1938 | Smith | 43—42.35 X |
| 2,173,540 | 9/1939 | Rayburn | 43—42.35 X |
| 2,573,592 | 10/1951 | Nickel | 43—42.22 X |
| 2,994,982 | 8/1961 | Murawski | 43—42.35 X |

WARNER H. CAMP, Primary Examiner

U.S. Cl. X.R.

43—42.33